Dec. 21, 1965
C. GUDMUNDSON
3,224,019
BOAT TRAILER
Filed Feb. 5, 1964
2 Sheets-Sheet 1
FIG. 1.
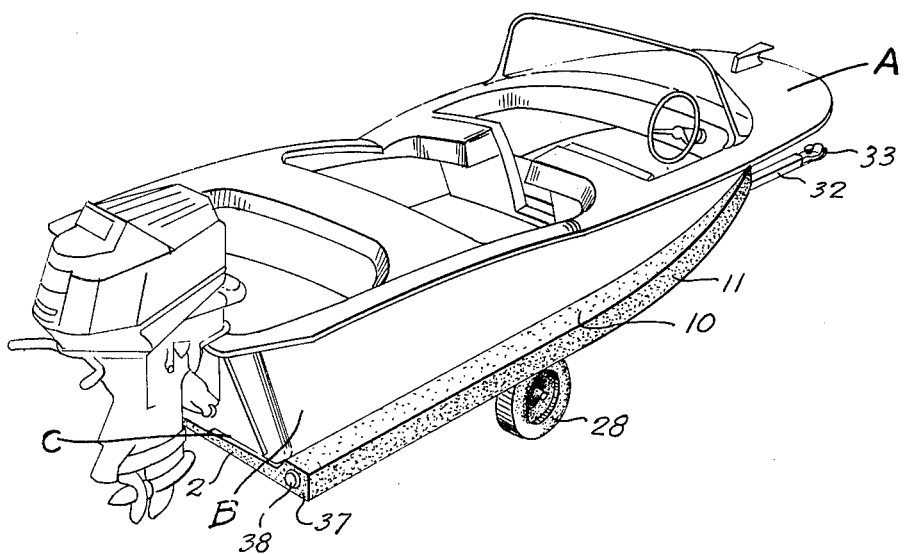
FIG. 2.
FIG. 3.
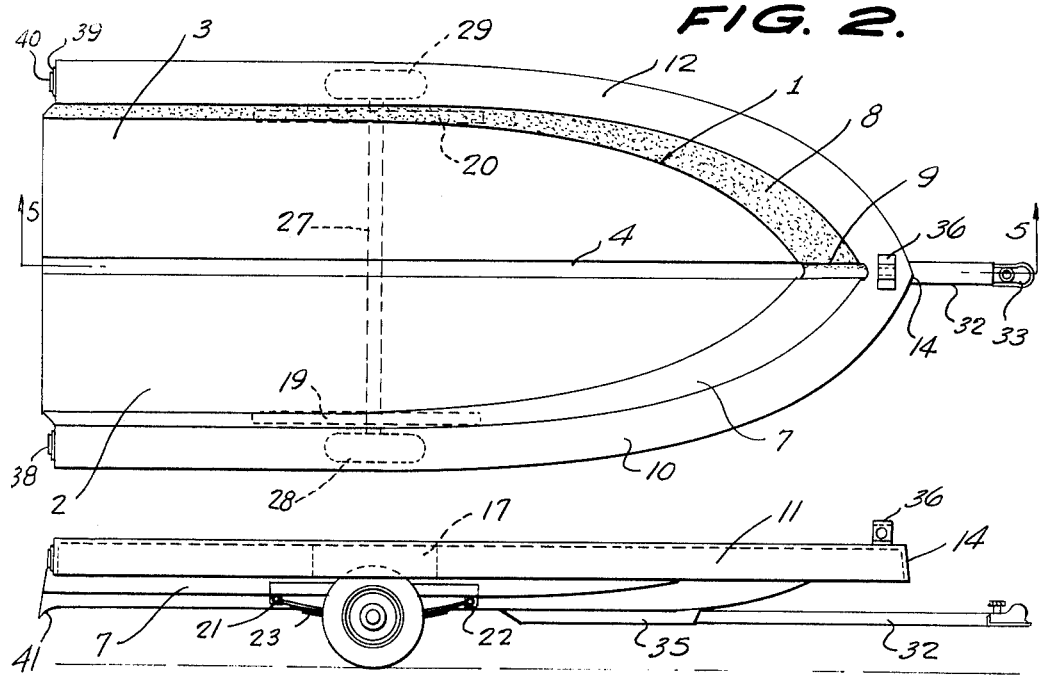
INVENTOR.
CLARK GUDMUNDSON,
BY
Linton and Linton
ATTORNEYS.

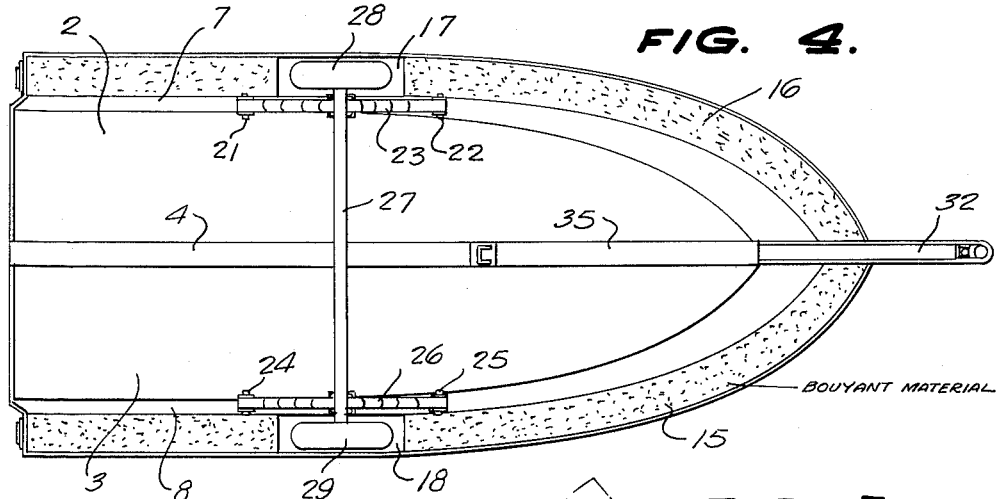
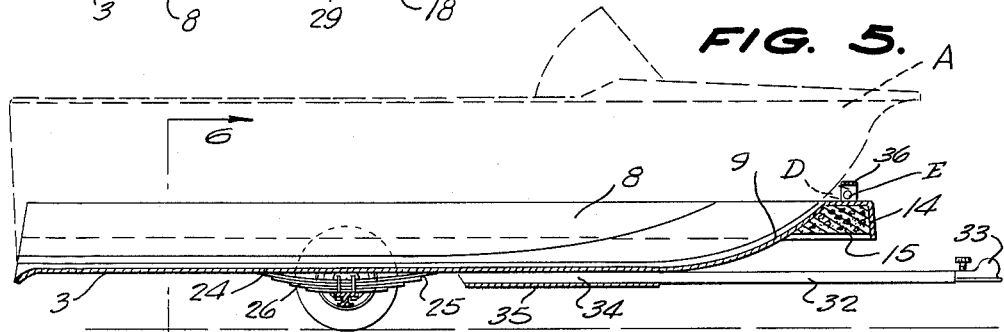
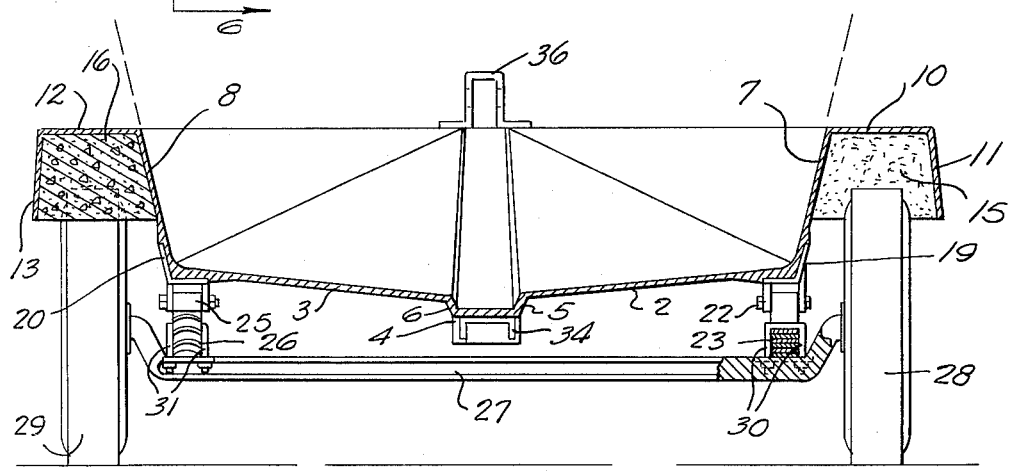

United States Patent Office 3,224,019
Patented Dec. 21, 1965

3,224,019
BOAT TRAILER
Clark Gudmundson, 260 North 500 West,
Bountiful, Utah
Filed Feb. 5, 1964, Ser. No. 342,653
8 Claims. (Cl. 9—1)

The present invention is concerned with a boat trailer and more particularly with a portable and towable trailer for supporting a boat thereon.

The principal object of the present invention is to provide a wheeled trailer having a boat-receiving body of a sheet material formed to fit the bottom and a portion of the sides of the boat, which body supports and protects the entire bottom of the boat, prevents the boat from shifting laterally therein when the trailer is being moved and yet permits the boat to be moved onto and off said body without the use of rollers therebetween.

A further and important object of the invention is to provide a lightweight, economically produceable boat trailer that carries a boat thereon set closer to the road than in known trailers tending to prevent the overturning of the boat and trailer when being towed and yet permits the boat to be loaded or unloaded relative to the trailer with or without the trailer being in the water upon which the boat is used.

Another important object of the invention is to provide a boat trailer having a boat supporting body which can be molded in one piece with the trailer wheel carrying frame and tow bar as well as fastening elements and which body can be of the same material, finish and color as the boat to be carried thereon.

A still further important object of the invention is to provide a floatable boat trailer having a walk-way around the top edge thereof which provides a fender well for various size trailer wheels as well as buoyant material to floatably support the trailer in the water.

Further objects of the invention will be in part obvious and in part pointed out in the following description of the accompanying drawings, in which:

FIG. 1 is a rear perspective view of the present trailer with a boat thereon;

FIG. 2 is a top plan view of the trailer;

FIG. 3 is a side elevation of the trailer taken from the right side of FIG. 1;

FIG. 4 is a bottom view of the trailer;

FIG. 5 is a longitudinal sectional view taken on the line 5—5 of FIG. 2 with a boat thereon shown in dotted lines; and FIG. 6 is an enlarged cross-sectional view of the trailer taken on line 6—6 of FIG. 5.

Referring now more particularly to the accompanying drawings wherein like and corresponding elements are indicated by similar reference characters, numeral 1 generally indicates the body of the trailer formed of one-piece material such as aluminum, plywood or reinforced plastic, for example, fiberglas. Said body has a bottom consisting of downwardly slanting portions 2 and 3 connected to a medial portion 4 by longitudinally extending walls 5 and 6 respectively providing a keel well.

Bottom portion 2 is integral with an upwardly extending side 7, while bottom portion 3 is likewise integral with the opposite upwardly extending side 8. Sides 7 and 8 curve longitudinally towards one another meeting and forming a bow point 9.

Side 7 is also integral with a lateral top portion 10 from which extends a skirt 11 integral therewith. Similarly, side 8 is integral with a lateral top portion 12 from which extends a skirt 13 integral therewith. Said top portions 10 and 12 extend along the length of their sides 7 and 8 respectively and likewise skirts 11 and 13 extend along the length of their connected top side 10 and 12 respectively with said skirts meeting and being integral together at bow point 14.

Side 7, top portion 10 and skirt 11 provide a well filled with a floatable material 15 except at well portion 17. Similarly, side 8, top portion 12 and skirt 13 provide a well filled with a floatable material 16 except at well portion 18. Said floatable material may be any conventional material such as cork or a plastic such as, for example, styrafoam.

An elongated metal angle bar 19 is attached to the body 1 along the medial section of the connection between bottom portion 2 and side 7 while a second elongated metal angle bar 20 is attached to said body along the medial section of the connection between bottom portion 3 and side 8 opposite to bar 19.

A leaf spring 23 is connected at its ends to the bar 19 by links 21 and 22 while a second leaf spring 26 is connected at its ends to the bar 20 by links 24 and 25. An axle 27 rotatably carrying wheels 28 and 29 extends laterally of body 1 with wheel 28 in well portion 17 and wheel 29 in well portion 18. Clamps 30 attach axle 27 to the middle of spring 23 while clamps 31 attach said axle to the middle of spring 26.

A tow bar 32 has a conventional trailer hitch coupling 32 connected to one end for attaching to a mating element, not shown, connected to a tow vehicle. The opposite end portion 34 is fixedly connected to body 1 in any conventional manner, or by being molded in portion 35 of said body as shown in FIG. 5.

An inverted U-shaped cleat 36 is fixedly mounted on the front of top portions 10 and 12 for receiving a bow eye D of boat A therein whereby a locking bolt or lock E can extend therethrough retaining the boat A on body 1.

An end wall 37 is integral with and closes off the rear end of side 7, top portion 10 and skirt 11 and has a tail light or reflector 38 mounted therein. Similarly, an end wall 39 is integral with and closes off the rear end of side 8, top portion 12 and skirt 13 and has tail light or reflector 40 mounted thereon.

The rear edge 41 of the bottom 2–4 is curved downwardly to facilitate loading and unloading boat A thereon.

Body 1 of the trailer can be formed from various materials such as a metal, preferably aluminum, which can be stamped to shape, or plywood with a sheet thereof formed in any conventional manner to the shape desired, but it is preferably to mold body 1 from a plastic, such as reinforced fiberglass. When molding the plastic, bars 19 and 20 can be molded onto said body for being fixedly connected thereto as can cleat 36. Similarly, tow bar 32 can have portion 34 molded along bottom portion 4 and thus encased in plastic 35 whereby it will be fixedly connected to said body.

The floatable material 15 and 16, if styrafoam or like plastic, can be molded right into the well of said body and will thus attach itself to the body 1 or conventional attaching means can be used.

The shape of body 1 can be varied from that shown in the drawings and can, for example, be formed with a shape which is custom fitted to the bottom C and a portion of the sides B of the boat A to be used thereon. Also, body 1 may have the same inside finish as the outside of boat A whereby there is a similarity in appearance, but more important, the similar finishes permit the boat A to move onto or off body 1 with a minimum of friction so that the boat does not have to be floated on or off the trailer and the towing vehicle does not have to be placed too close to the water's edge. However, the trailer will float when in water and can be used as a dry dock for the boat or for floating the boat on and off the same.

The top portions 10 and 12 provide walk-ways for the user to move around the boat even when the trailer is in the water.

In use of the present trailer, coupling 33 can be attached to a ball hitch, not shown, attached to a tow vehicle whereby the trailer with or without the boat A may be transported from place to place. If the trailer is backed into the water, it will float on material 15 and 16 with bottom 2–4 beneath the water's surface whereby boat A can be floated on or off body 1.

However, when the trailer is out of the water, coupling 33 can be unhitched from the tow vehicle and body 1 tilted about wheels 28 and 29 until end 41 touches the ground whereupon boat A can be slid along bottom 2–4 to or from said body and coupling 33 re-attached to the tow vehicle after leveling body 1.

Re-inforced plastic, as referred to herein, is directed to various forms of such material as, for example, fiberglass and polyester, fiberglass and epoxy, fiberglass and phenolic resin, Dacron or nylon or burlap in combination with a resin such as polyester, or epoxy or phenolic.

The present trailer is capable of considerable modification, and such changes thereto as come within the scope of the appended claims are deemed to be a part of the present invention.

I claim:

1. A towable boat trailer comprising a body having a bottom, a pair of sides extending from opposite edges of said bottom, a pair of upper portions each extending laterally from one of said sides, and a pair of skirts each extending from one of said upper portions providing a well with its upper portion and connected side, a tow bar fixedly connected to said body bottom, a pair of angle bars each fixedly connected to said body bottom and one of said sides at a medial portion thereof, wheels resiliently connected to said angle bars and each extending into one of said wells.

2. A towable boat trailer as claimed in claim 1, wherein each of said wells contains a floatable material for floatably supporting the trailer in water.

3. A towable boat trailer comprising a molded reinforced plastic body having a bottom, a pair of sides each extending from an opposite side of said bottom with the interior of said bottom and sides having general configuration of the exterior of the bottom and a portion of the sides of a boat to be mounted thereon, a pair of angle irons each fixedly embedded longitudinally of and in said bottom and one of said sides, wheels resiliently carried by said angle irons and a tow bar embedded in said body bottom and extending longitudinally thereof and therefrom.

4. A towable boat trailer as claimed in claim 3, wherein said body has a pair of flat top portions each extending laterally of and along the length of one of said sides providing a walk-way and a pair of skirts each extending laterally of and along the length of one of said top portions forming an inverted U-shaped well with its top portion and associated side, a floatable material fixedly positioned in said wells.

5. A towable boat trailer as claimed in claim 3, wherein a pair of flat top portions each extends laterally from and along the length of one of said sides meeting at the front of the trailer and a cleat is fixedly mounted on said top portions at the front of the trailer for attachment to the boat to be carried.

6. A towable boat trailer as claimed in claim 3, wherein a pair of springs are each connected to one of said angle irons and an axle rotatably carrying said wheels is connected to said springs laterally of said trailer body.

7. A towable boat trailer as claimed in claim 3, wherein said body has the end thereof opposite said tow bar open between said bottom and said sides.

8. A towable boat trailer as claimed in claim 3, wherein said body has a pair of walls extending laterally thereof at an end opposite to the tow bar and signalling means are mounted on said walls.

References Cited by the Examiner
UNITED STATES PATENTS

| | | | |
|---|---|---|---|
| 2,211,083 | 8/1940 | Smith. | |
| 2,256,038 | 9/1941 | Woodruff. | |
| 2,792,237 | 5/1957 | Paulson | 280—414 |
| 3,126,855 | 3/1964 | Freeburg | 114—45 |

LEO FRIAGLIA, *Primary Examiner.*